AUTOMATIC RECORDING TAPE SPLICER

Filed June 14, 1962 3 Sheets-Sheet 1

INVENTOR.
JOHN R. DURIO
BY Moody and Antrim
AGENTS

AUTOMATIC RECORDING TAPE SPLICER

Filed June 14, 1962 3 Sheets-Sheet 2

INVENTOR.
JOHN R. DURIO
BY Moody and Antrim
AGENTS

INVENTOR.
JOHN R. DURIO
BY Moody and Antrim
AGENTS

United States Patent Office 3,152,227
Patented Oct. 6, 1964

3,152,227
AUTOMATIC RECORDING TAPE SPLICER

John R. Durio, Costa Mesa, Calif., assignor to Collins Radio Company, Cedar Rapids, Iowa, a corporation of Iowa Filed June 14, 1962, Ser. No. 202,436
4 Claims. (Cl. 179—100.2)

This invention pertains to equipments for splicing magnetic recording tape and particularly to equipments for splicing automatically tape that is marked electrically during editing.

Through the use of the device of this invention, a portion of the tape may be deleted and a single splice made automatically before editing is continued, or the entire length of the tape may be edited and then spliced at all points required without further attention.

To provide automatic splicing, devices required for cutting and splicing are added to a tape player or to a combination recorder and player. Either the usual recording head or an additional head is used to mark the portions of the tape that are to be deleted. The added devices include a rotary cutter, two slowly driven rollers that advance the tape while it is cut apart, a pair of trap doors for guiding the tape as required from its usual channel to a discard container or for guiding it along the usual channel to a position for splicing, a photoelectric control device for positioning accurately the cut ends of the tape for splicing, and a device for dispensing, cutting, and applying splicing tape. These devices are operated in proper sequence for required intervals by electric switching and delay circuits.

An object of this invention is to provide in combination with a tape player a device for automatically cutting and discarding marked portions of tape and for splicing together the desired portions.

Another object is to facilitate rapid editing of a reel of tape by providing for automatic splicing at any number of points on the tape after the tape has been completely edited.

Figure 1:
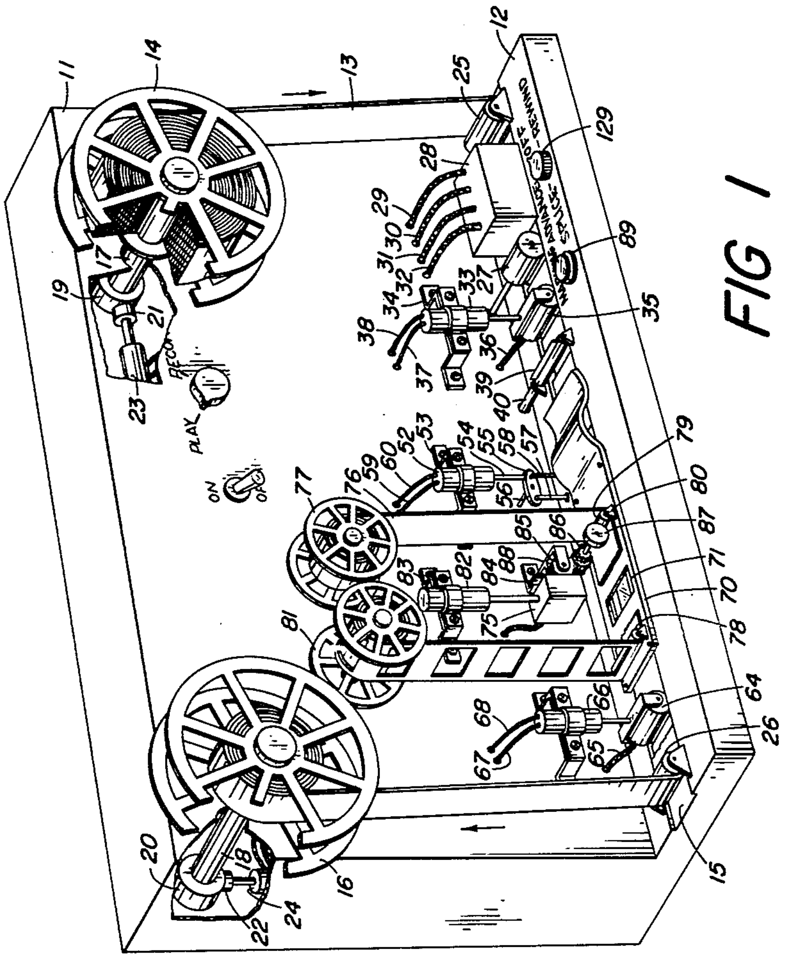
Figure 2:
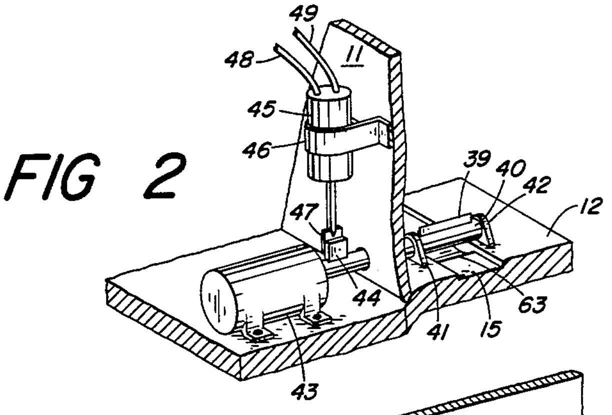
Figure 3:
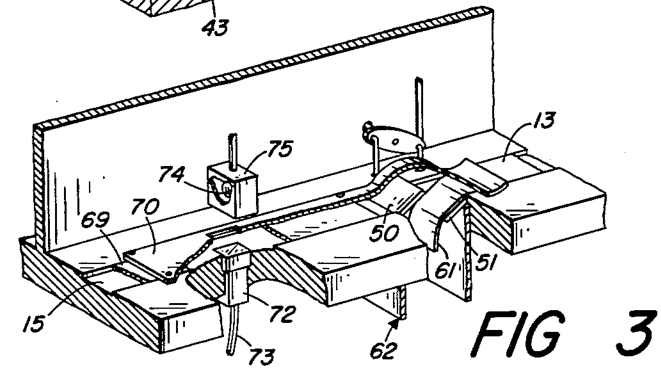
Figure 4:
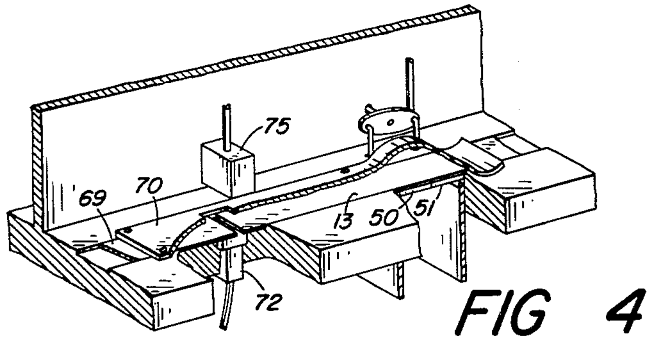
Figure 5:
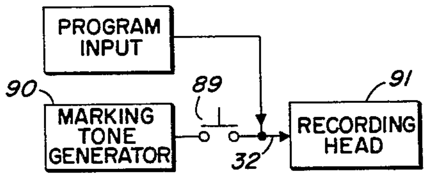
Figure 6:
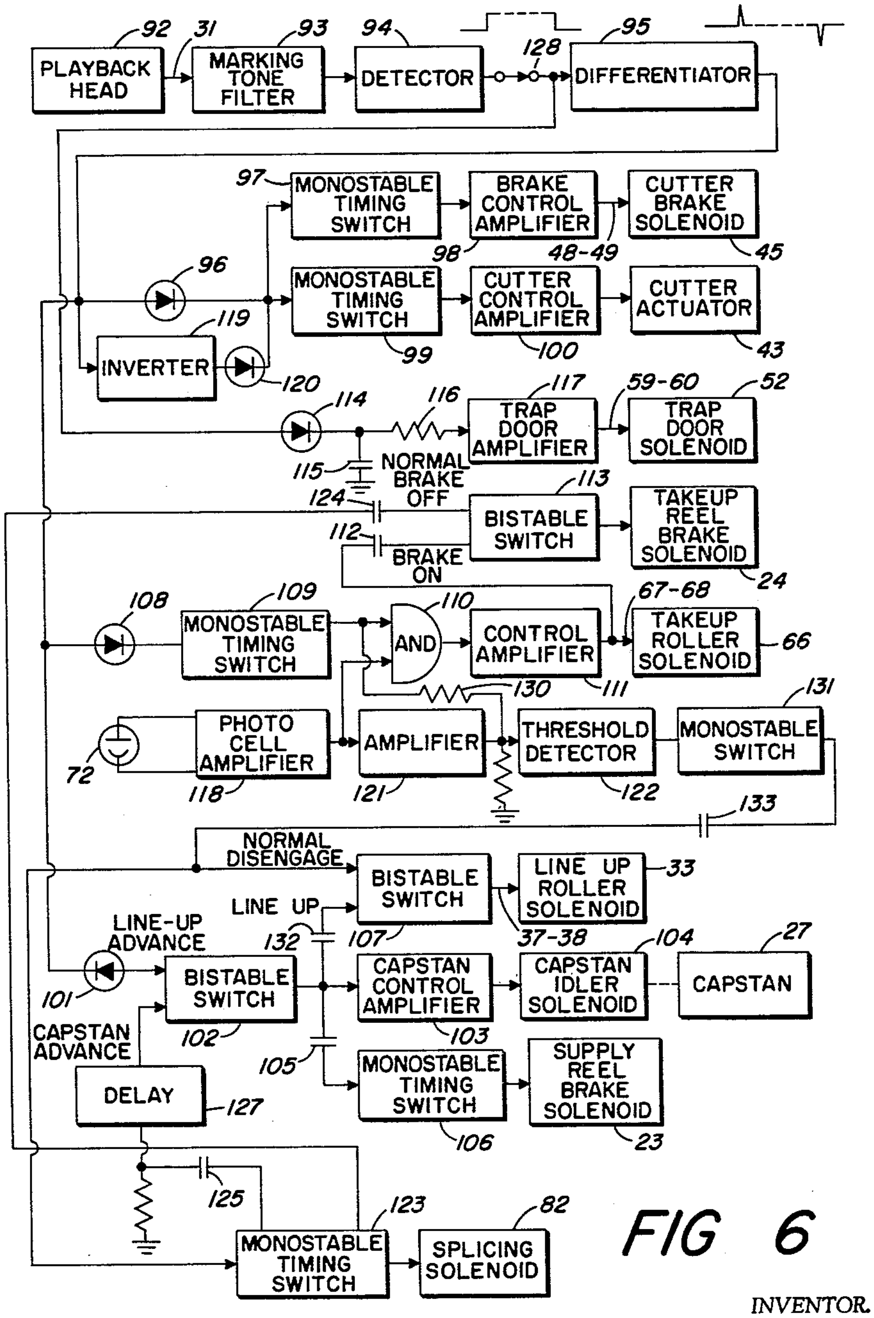

The following description and the appended claims may be more readily understood with reference to the accompanying drawings in which:

FIGURE 1 is a front oblique view of a magnetic tape recorder and player in combination with the automatic tape splicer of this invention;

FIGURES 2, 3, and 4 are top oblique views of portions of the mounting base of FIGURE 1 to show respectively the mounting of the cutter, the travel of discarded recording tape through open trap doors, and the travel of tape over closed trap doors to the position at which it is spliced;

FIGURE 5 is a block diagram of the circuit that controls the recording head to mark tape to be discarded; and FIGURE 6 is a block diagram of the sequence control switch circuit of the automatic tape splicer.

With reference to FIGURE 1, the conventional magnetic tape recorder and player to which the automatic splicer is added includes a vertical mounting panel 11 attached to a horizontal mounting base 12. The magnetic tape 13 during intervals for recording or playing back the tape, is unwound from supply reel 14 and travels under idle roller 25, along guide channel 15 which extends across base 12, under idle roller 26 to take-up reel 16. The tape is advanced in the usual manner by capstan 27 while a conventional rotating friction wheel (not shown) continually urges the take-up reel 16 in the required direction for winding up the tape. During rewind, the travel of the tape is reversed in the usual manner. The reels 14 and 16 are removably mounted on shafts 17 and 18 which are rotatably mounted on panel 11. Conventional holdback brake drums 19 and 20 are mounted securely on reel shafts 17 and 18, respectively. Shock relief brakes 21 and 22 that are normally released are operated by brake solenoids 23 and 24 when required to apply pressure to the respective brake drums 19 and 20 for quickly retarding the rotary motion of the respective reels.

A head assembly 28 is mounted on the recorder base 12 in line with tape guide channel 15. The head assembly may have the conventional heads including a recording head to which conductor 29 is connected, an erase head to which conductor 30 is connected, and a playback head to which conductor 31 is connected. If an edge of the tape is to be marked as described below, an additional marking head having conductor 32 may be added. The magnetic tape 13 is advanced relative to the head assembly in the usual manner by capstan 27 during periods of recording or of playback. The capstan is engaged for rotation with a drive assembly that is common to other driven portions of equipments in response to the operation of a control solenoid (not shown in FIGURE 1) either to engage a conventional clutch or an idle gear.

The tape cutter comprises a cutting blade 39 mounted on a rotatable shaft 40. The orientation and shape of the blade on the shaft is such that either the tape is cut diagonally on a straight line or is cut in a slight S shape across the tape so that the subsequent completed splice causes a minimum of noise on playback. With reference to FIGURE 2, the shaft 40 is rotatably mounted slightly above and transverse tape guide 15 by bearing mounting brackets 41 and 42. If desired, the shaft may be extended through the vertical mounting panel 11 as shown in FIGURE 2 to be coupled with impulse motor 43 that is mounted on the base 12. A stop arm 44 which is located between the motor and the vertical mounting panel extends radially from the shaft. A cutter brake solenoid 45 is mounted vertically in line with the stop arm by mounting bracket 46 that is secured to the back surface of the vertical panel. A cutter brake stop 47 is secured to the lower end of the vertical plunger of the solenoid 45. Normally the plunger is extended downward so that stop arm 44 strikes the cutter brake stop 47 to prevent rotation of stop arm 44. When the solenoid 45 is energized by the application of voltage to its conductors 48 and 49, the plunger of solenoid 45 is retracted to withdraw cutter brake stop 47 from the path of stop arm 44. When the tape is to be cut, an impulse of voltage is applied to the conductors of the impulse motor 43, and the solenoid 45 is operated simultaneously long enough to permit the shaft 40 to which is secured cutting blade 39, to complete one revolution for cutting the tape. A slight cylindrical depression 63 beneath the tape cutter shaft 40 in the tape guide channel 15 permits the cutter to divide the tape without the cutter striking the base 12.

After the magnetic tape 13 is cut at the end of the portion to be removed by cutter 39 in response to sensing circuits encountering a mark that has been applied by the head assembly 28, the tape is advanced by supply line-up roller 35 which is driven by flexible cable 36 that is coupled to the common drive system. The line-up roller 35 is centered above the tape guide 15 and is normally positioned a short disance above the tape. The line-up roller is rotatably mounted on a bracket supported by the plunger of solenoid 33. The solenoid 33 is mounted to vertical panel 11 such that when the plunger, which is actuated when the solenoid is energized by the application of voltage to its conductors 37 and 38, is extended downwardly the roller 35 bears against the tape for advancing it along the guide past the cutter.

A pair of trap doors 50 and 51 shown in FIGURE 3 are rotatably mounted across the tape guide channel 15. The trap doors are located beneath the splicing die plate 70 a short distance from the cutting position of the tape. The doors are soon encountered by the tape while the tape is being advanced by the capstan 27. The die plate 70 has a curved ridge above the trap doors in order to permit trap door 50 to be opened upward. Immediately after the first cut is made for removing a portion of the tape to be discarded, the trap doors are opened by operation of the trap door solenoid 52 of FIGURE 1. The solenoid is mounted vertically to the vertical panel 11 by mounting bracket 53. The vertical solenoid actuator rod 54 extends downwardly from the solenoid and attaches rotatably to one end of actuator lever 55. The center of lever 55 is rotatably mounted on a mounting rod 56 that extends horizontally from vertical mounting panel 11 over the center of the opening for the trap doors 50 and 51. The upper end of a trap door connecting rod 58 is rotatably connected to the same end of lever 55 that connects to the actuator rod 54, and the lower end of the rod 58 connects to the trap door 51. When the solenoid 52 is operated by the application of voltage to its conductors 59 and 60, the trap door 51 rotates downwardly about a mounting hinge at the edge of the opening in the bottom of the guide channel. Likewise, the upper end of connecting rod 57 is attached to the end of lever 55 on the opposite side of its fulcrum and the lower end is attached to the trap door 50 such that its edge which extends across the center of the opening is raised by rotation of the door about its hinge. As the tape is advanced, the cut end of the tape is deflected downwardly by the trap door 50 while it is raised, through the opening to a container 62. Obviously, when the cutter blade 39 is operated later, a portion 61 of the tape is discarded in the container 62.

While the cut end of the tape that is attached to supply reel 14 is being discarded, take-up roller 64 that is disposed further along the guide channel past the trap doors and the cutter, is operated to advance the tape that is still attached to take-up reel 16 until the cut end of this portion of the tape is positioned over a sensing device of the splicer. The take-up roller 64 is similar to the supply line-up roller 35 described above. The roller is coupled by flexible cable 65 to the drive system of the recorder and is rotatably mounted above the guide channel 15 on the vertical plunger rod of solenoid 66. Solenoid 66 is mounted vertically by a mounting bracket to vertical panel 11 and in response to the application of voltage to its conductors 67 and 68 is operated to extend its plunger downwardly for pressing its roller 64 against the magnetic tape.

With reference to FIGURE 3, when the portion 69 of the tape attached to the take-up reel is advanced until the cut end of the tape partly exposes the photocell 72, the take-up solenoid 66 is de-energized so that the end of the tape remains in that position required for automatically splicing it to the end of the tape that is attached to supply reel 14. After the tape is cut the second time for removing a marked portion to be deleted, the trap doors 50 and 51 are closed and the tape 13 that is attached to the supply reel 14 is advanced by supply line-up roller 35 until the cut ends of the two portions of the tape are butted together. The tape then obstructs the passage of light to photocell 72 and operates control circuits of the automatic splicing device.

The lower portion of the splicing device is mounted on the splicing die plate 70 that is centered longitudinally over the guide channel 15. The end of the plate that extends slightly beyond the trap doors is curved upwardly to guide the cut end of the magnetic tape beneath the die plate. The die plate 70 has a rectangular opening 71 that is approximately the same width as the tape and that is centered over the tape below a die block 75. The photocell 72 is mounted in recorder base 12 so that its light sensitive surface is facing upwardly below the center of the rectangular opening 71. The magnetic tape normally covers the photocell. The photocell 72 is connected to a photocell amplifier through conducting cable 73. The light for operating the photocell 72 is derived from the lamp 74 that is mounted in the die block 75 which is positioned directly above the photocell. The cut ends of the magnetic tape are spliced together by the automatic application of splicing tape 76. The splicing tape is supplied from supply reel 77 and unused portions of the tape are wound on take-up reel 81. A splicing tape idle roller 79 is rotatably mounted by bracket 80 to the splicing die plate 70 approximately below the supply reel 77 transverse the die plate and likewise the splicing tape idle roller 78 is rotatably mounted below take-up reel 81. The supply reel 77 is rotatably mounted to vertical panel 11 and has friction means (not shown) for preventing its free rotation. Take-up reel 81 is affixed to a rotatable shaft that is coupled to a rotatable friction drive (not shown) for taking up the slack in splicing tape 76. The splicing tape is threaded beneath the idle rollers 79 and 80 to guide the tape over the opening 71 of the splicing die plate 70.

The die block 75 is normally mounted above the plate opening 71 by the plunger of the splicing die block solenoid 82. The splicing solenoid 82 is centered over opening 71 of the splicing die plate 70 by mounting bracket 83 that is attached to the vertical mounting panel 11. A vertical rack 84 is secured to a vertical side of the die block 75 and engages an idle spur gear 85. The spur gear 85 is rotatably mounted on a horizontal shaft that is supported by a mounting bracket 88 that is attached to the splicing die plate 70. The spur gear 85 is drivingly engaged to the ratchet 86 which is effective in rotating its rotatably mounted horizontal shaft during downward movement of the rack 84. The splicing tape advancing roller 87 is constrained to rotate with the shaft upon which the ratchet is mounted. The roller 87 bears against the splicing tape 76 for advancing it during downward motion of the die block so that a portion of the tape is over the die block opening 71 by the time that the die block 75 starts to enter the opening. The die block is a sliding fit within the opening and its edges are sharp for cutting a portion of the tape for application to the magnetic recording tape that is positioned below the opening. Most of the bottom surface of the die block inside the cutting edges is transparent to transmit the light from lamp 74 that is mounted within the die block 75. The bottom surface presses the cut out piece of tape firmly on to the ends of the magnetic tape head. Heat sensitive tape may be used and sufficient heat for its application supplied by lamp 74 or an auxiliary heat element. As described below after an interval determined by a timer, the splicing solenoid 82 is de-energized and the die block is again raised above the splicing die plate 70. The magnetic tape is now ready to be advanced normally by the capstan.

Electrical circuits for operating the automatic tape splicer are shown in FIGURES 5 and 6. While the tape is being advanced normally by capstan 27, the operator who is editing determines at what point a splice should be made. The operator rotates the control 129 shown in FIGURE 1 to rewind until the tap that is to be marked for removal is again wound upon supply reel 14. Control 129 is then operated to Advance. Just before the part to be removed is played back, a marking return spring switch actuator 89 is pressed until the end of the portion that is to be removed is encountered. Marking tone generator 90 of FIGURE 5 is connected through the marking control switch 89 to the recording head 91. When the usual recording head is being used for removing the tape, the tone generated by marking tone generator 90 may be a supersonic tone, or if a special recording head is used for marking the edge of the tape, the frequency of the marking tone may be within the audible frequency range if desired. After the tape is marked, the tape is again rewound until the marked portion is wound onto the supply reel. The control 129 is then operated to splice for again closing usual circuits to advance the tape and, in addition, for closing switch contacts 128 that are shown connected between the detector 94 and the differentiator 95 of FIGURE 6. A section of the switch may be used for connecting the playback head 92 to the marking tone filter 93 and for supplying power to the various switching circuits.

The circuits for developing the basic control voltages for controlling the switching circuits and amplifiers shown in FIGURE 6 comprises the playback head 92, marking tone filter 93, and detector 94 connected in cascade. When the playback head 92 encounters the tone, a constant direct-current voltage is developed at the output of the detector 94. The output of the detector 94 is connected through switch contacts 128 to the differentiator 95. At the start of the tone, the differentiator provides a sharp pulse of a polarity for operating certain switching circuits, and at the end of the tone provides a sharp pulse of the opposite polarity for reoperating some of the same switching circuits and for operating additional switching circuits.

The output of the differentiator 95 is connected through diode 96 and a parallel inverter and diode 120 to the input of monostable timing switch 97. The output of the monostable timing switch 97 is connected through brake control amplifier 98 to the cutter brake solenoid 45. Normally switch 97 is in a stable state for biasing brake control amplifier 98 such that it is cut off and the cutter brake solenoid 45 is released. In response to the application through the diode 96 of the pulse corresponding to the start of the marking tone, the monostable timing switch operates to its other state for a length of time determined by the values of its components to bias the amplifier 98 for operating the solenoid 45. Therefore, the brake stop 47 of FIGURE 2 is raised out of the path of the stop arm 44 of the cutter shaft.

A start pulse is also applied to the input of monostable timing switch 99 that in a similar manner controls the time that the succeeding cutter control amplifier 100 will provide current for the cutter actuator 43. The timing of the switches 97 and 99 are related so that the cutter 39 that is rotated by the cutter actuator 43 makes only one revolution to cut the tape before the stop arm 44 of the shaft again engages the brake stop 47 which has been returned to its normal position by the release of cutter brake solenoid 45.

A circuit from the output of differentiator 95 is connected through diode 108 for controlling the take-up roller solenoid and the take-up reel brake. The diode is connected to the input of monostable timing switch 109 that has its output connected to one input of an AND circuit 110. The other input of the AND circuit is connected to a photocell amplifier and is normally of the proper polarity for providing conduction through the AND circuit in response to the operation of the monostable timing switch 109. The time constant of switch 109 is adjusted so that it will be operated to its unstable state in response to the application of the first marking pulse for an interval slightly longer than that required for the takeup roller to advance the magnetic tape of the take-up reel until the end of the tape is in position for splicing. While the timing switch 109 is operated to its unstable state as the AND circuit is maintained conductive by the photocell amplifier, the control amplifier 111 that is connected through the output of the AND circuit provides output current to take-up roller solenoid 66. Operation of the solenoid causes the takeuproller to bear against the magnetic tape for advancing it slowly. The output of the control amplifier is also connected through capacitor 112 to the bistable switch 113 for controlling the take-up reel brake. When the control amplifier 111 starts substantial current flow to the take-up roller solenoid, a pulse of current is applied to the bistable switch 113 for operating it from its normal state to its other state to cause current to flow through the take-up reel brake solenoid 24. The take-up brake is pressed against the brake drum of the take-up reel until the slicing operation is completed.

A circuit for actuating the trap doors 50 and 51 is connected from the output of detector 94 through diode 114 and a delay circuit comprising resistor 116 and capacitor 115 to the input of an amplifier 117. Normally the amplifier 117 is biased so that the trap door solenoid 52 that is connected to the output of the amplifier is de-energized. The amplifier 117 supplies sufficient current to solenoid 52 for operating it at the end of an interval determined by the values of capacitor 115 and resistor 116 after the marking tone is applied. The solenoid remains operative as long as the tone is applied.

When that cut end of the magnetic tape which is being advanced by the take-up roller is positioned under the splicing die block 75, the light from the lamp mounted within the die block shines on photocell 72 to cause its conductivity to increase. The photocell is connected to the input of amplifier 118, the output of which is connected to one input of AND circuit 110 as described above. The change in voltage at the output of the amplifier in response to the increased current flow from the photocell 72 causes the AND circuit to become nonconductive and therefore reduces the output voltage at the output of the succeeding control amplifier 111. The take-up roller solenoid 66 that is connected to the output of the amplifier is therefore de-energized for withdrawing the roller 64 from the surface of the magnetic tape. Shortly after the tape-up portion of the tape is in place for splicing, the monostable timing switch 109 returns to its stable state for disabling the AND circuit and for enabling the threshold detector circuit 122.

When the last marked portion of the tape passes the playback head, the output of detector 94 returns abruptly to zero and a stop pulse opposite in polarity to start pluse is formed at the output of the differentiator 95. The stop pulse is applied through inverter 119 and diode 120 to the input of monostable timing switch 97 for controlling the cutter brake 45 and to the input of monostable timing switch 99 for controlling the cutter actuator 43. The cutter operates, as described above, to cut the tape at the end of the desired portion that is to be discarded. The trap door solenoid 52 is released in response to the removal of detector output voltage from the input of the trap door control circuit which includes diode 114 and a delay circuit comprising resistor 116 and capacitor 115. The delay circuit which is connected to amplifier 117 delays the closing of the trap door for an interval that is shorter than that required for the tape to be advanced by the line-up roller from the cutter to the trap doors. The tape then passes over the trap doors as illustrated in FIGURE 4 until its cut end is adjacent to the cut end of that portion of the tape that is on the take-up reel.

A circuit for controlling decrease in the speed of the tape is also connected to the output of the differentiator 95. The output is connected to one of the control circuits of bistable switch 102 through diode 101 that is connected in the required sense for conducting the pulse generated at the end of the marked portion of the magnetic tape. While switch 102 is in its normal stable state before a final marking impulse is applied, the capstan 27 is engaged for rotation and the tape is being advanced at its normal playback speed. When the impulse which marks the ending of the splice is applied from differentiator 95, the capstan is disengaged, the speed of the supply reel is checked by a brake as necessary, and the line-up roller bears against the magnetic tape for advancing it slowly. The output of bistable switch 102 is connected to the input of capstan control amplifier 103 which has its output connected to the capstan idler solenoid 104. The capstan idler solenoid 104 disengages a capstan idle gear (not shown) for disengaging capstan 27 in response to bistable switch being operated in response to the application of the marking pulse at the ending of the splice. The output of the bistable switch 102 is also connected through capacitor 105 to monostable timing switch 106 for controlling the supply reel brake solenoid 23. In response to the application of the final pulse, a monostable timing switch operates to its unstable state for a sufficient length of time for operating brake solenoid 23 for causing its associated brake 21 to absorb the inertial motion of supply reel 14.

For operating the line-up roller solenoid, the same output of bistable switch 102 is connected through capacitor 132 for operating bistable switch 107 that has its output connected to line-up roller solenoid 33. Normally the current flow at the output of bistable switch 107 is insufficient for operating line-up roller solenoid 33. In response to the operation of bistable switch 107 sufficient current is supplied for operating the solenoid to cause the line-up roller 35 to bear against the magnetic tape.

The line-up solenoid 33 is released when the opening above the photocell is obstructed by the tape. When the light is obstructed, the output of photocell 72 is decreased and also the output of the photocell amplifier 118 is decreased so that only a small input voltage is applied to the succeeding amplifier 121. These voltage changes are ineffective in operating the AND circuit 110 because the AND circuit has been disabled by the previous operation of monostable timing switch 109 to its normal state as previously described. Before the switch 109 operated, a biasing voltage was applied through resistor 130 to the input of threshold detector 122 that is also connected to the output of amplifier 121. While the bias is applied through resistor 130, the threshold detector has an output voltage as if an output were continuously present from photocell 72. Since the monostable timing switch is now operated to its unstable state, the fixed bias at the input of the threshold detector is removed so that the detector can sense a decrease in the output of photocell 72.

The output of the threshold detector 122 is connected to the input of monostable switch 131. The operation of the monostable switch controls the release of line-up solenoid 33 and the operation of the splicing solenoid 82. Normally the bias applied from resistor 130 or from the conductivity of photocell 72 maintains monostable switch 131 in a state that might be termed its unstable state since the bias is required to maintain it at that state. When the monostable switch operates in response to the removal of voltage to the input of threshold detector 122, a pulse of proper polarity is formed in the output of the switch for application through capacitor 133 to the input of bistable switch 107 for returning it to its normal state of operation. The pulse is also applied to the input of monostable timing switch 123. In response to the application of the pulse, bistable switch 107 operates to release line-up roller solenoid 33. The roller is then removed from contact with the magnetic tape so that the ends of the tape remain abutted together in preparation for splicing.

The timing switch 123 is operated to its unstable state as determined by the time constant of its components for operating splicing solenoid 82 which is connected to the output of the timing switch. As described previously, on its downward movement the splicing solenoid cuts a strip of splicing tape and presses it against the magnetic recording tape. When heat sensitive splicing tape is used, the timing switch provides pressure for the required time necessary to heat the tape from the lamp or the heating element that is mounted within the die block 75. When monostable timing switch 123 returns to its normal state for splicing, a pulse of proper polarity is applied through capacitor 124 to the off circuit of bistable switch 113 to release the take-up reel brake solenoid 24. The take-up reel is then urged to rotate in the usual manner.

The output of the monostable timing switch of the proper polarity is also applied through capacitor 125 through a delay circuit 127 to one of the control circuits of bistable switch 102. In response to the application of the delay pulse, bistable switch 102 is returned to its normal states of operation for removing voltage from the input of capstan control amplifier 103. In response to the removal of the voltage, the capstan idler solenoid 104 is released to engage capstan 27. The recorder then operates in the normal manner to advance the tape at the usual rate for recording or for playback.

Although this invention has been described with respect to a particular embodiment thereof, it is not to be so limited, as changes and modifications may be made therein which are within the spirit and scope of the invention as defined by the appended claims.

What is claimed is:

1. In a magnetic tape player having a playback head, a capstan controllable for advancing magnetic tape, and guiding means for defining an accurate track for said advancing tape; an automatic tape splicer comprising, a recorder head mounted with its recording channel in line with said track, means for applying signal to said recorder head to mark the beginning and the ending of a portion of magnetic tape that is to be deleted, a cutter mounted transverse said track operable for dividing said advancing tape into a take-up portion and a supply portion at a point that has been advanced beyond said playback head and said capstan, deflecting means operable for deflecting the end of said supply portion from said track, a take-up roller assembly mounted in line with said track operable for advancing said take-up portion at a decreased speed, said cutter, said deflecting means and said take-up roller assembly being operated in response to said playback head encountering change in signal corresponding to said application for marking the beginning of the portion of magnetic tape to be removed, a splicing tape applicator and a photoelectric sensing device mounted between said take-up roller assembly and said deflecting means in line with said track, said magnetic tape while being advanced normally obstructing light to said photoelectric sensing device, means responsive to the cut end of said take-up portion partly uncovering said photoelectric sensing device for releasing said take-up roller assembly to retain said take-up portion in a fixed position relative to said splicing tape applicator, a supply roller assembly mounted in line with said track adjacent to said cutter for advancing said supply portion at a decreased speed, said cutter being operated momentarily and said supply roller assembly being operated in response to said playback head encountering change in signal corresponding to said application for marking the ending of said portion of magnetic tape to be removed, said deflecting means also being released in response to said last mentioned change in signal for guiding said supply portion along said track, said supply portion after the portion to be deleted has been cut off being advanced by said take-up roller assembly until its cut end abutts the cut end of said take-up portion and obstructs the light to said photoelectric sensing device, and means responsive to the decrease in conductivity of said photoelectric sensing device caused by the obstruction of light thereto for operating said splicing tape applicator.

2. An automatic tape splicer as claimed in claim 1 in which said cutter comprises a cutting blade mounted on a rotatable shaft transverse said track, a motor for rotating said shaft, a stop arm extending radially from said shaft, a stop normally within the rotating path of said arm, a solenoid for positioning said stop, means responsive to change in signal from said playback head for applying simultaneously a pulse of current to said motor and a pulse of current to said solenoid for their operation, said pulses having relative lengths required for operating said solenoid to remove said stop from the rotating path of said arm to permit only one rotation of said cutter shaft.

3. An automatic tape splicer as claimed in claim 1 in which said splicing tape applicator comprises, a die plate disposed over said track, reel and guide means for positioning splicing tape adjacent the surfaces of said die plate opposite said track, said die plate having an opening under which are positioned said cut ends to be spliced, a die block, a solenoid for mounting said die block in line to engage said opening as a sliding fit for cutting a portion from said splicing tape, a roller rotatably mounted in contact with said splicing tape, said last mentioned roller being rotatable for advancing said splicing tape, and means for coupling said last mentioned roller to said die block so that said last mentioned roller is rotated to advance said splicing tape during travel of said die block toward said die plate, and said means for operating said splicing tape applicator operating said solenoid to pass the lower surface of said die block through said opening for pressing a cut-out portion of said splicing tape against said cut ends of said magnetic tape.

4. An automatic tape splicer as claimed in claim 3, said die block having a transparent surface for applying said splicing tape, and a lamp mounted within said block for supplying light to said photoelectric sensing device.

No references cited.